Patented Apr. 3, 1923.

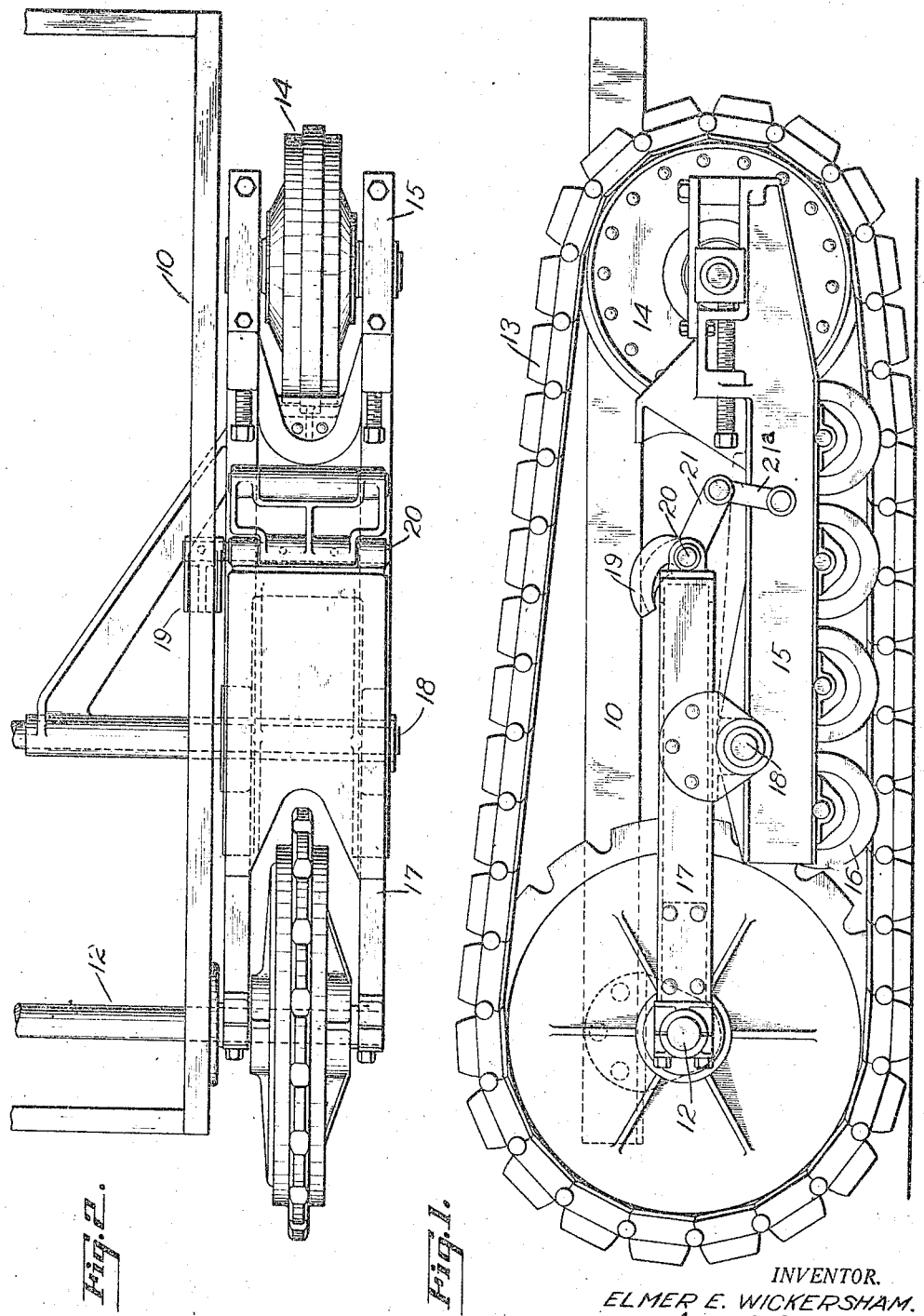

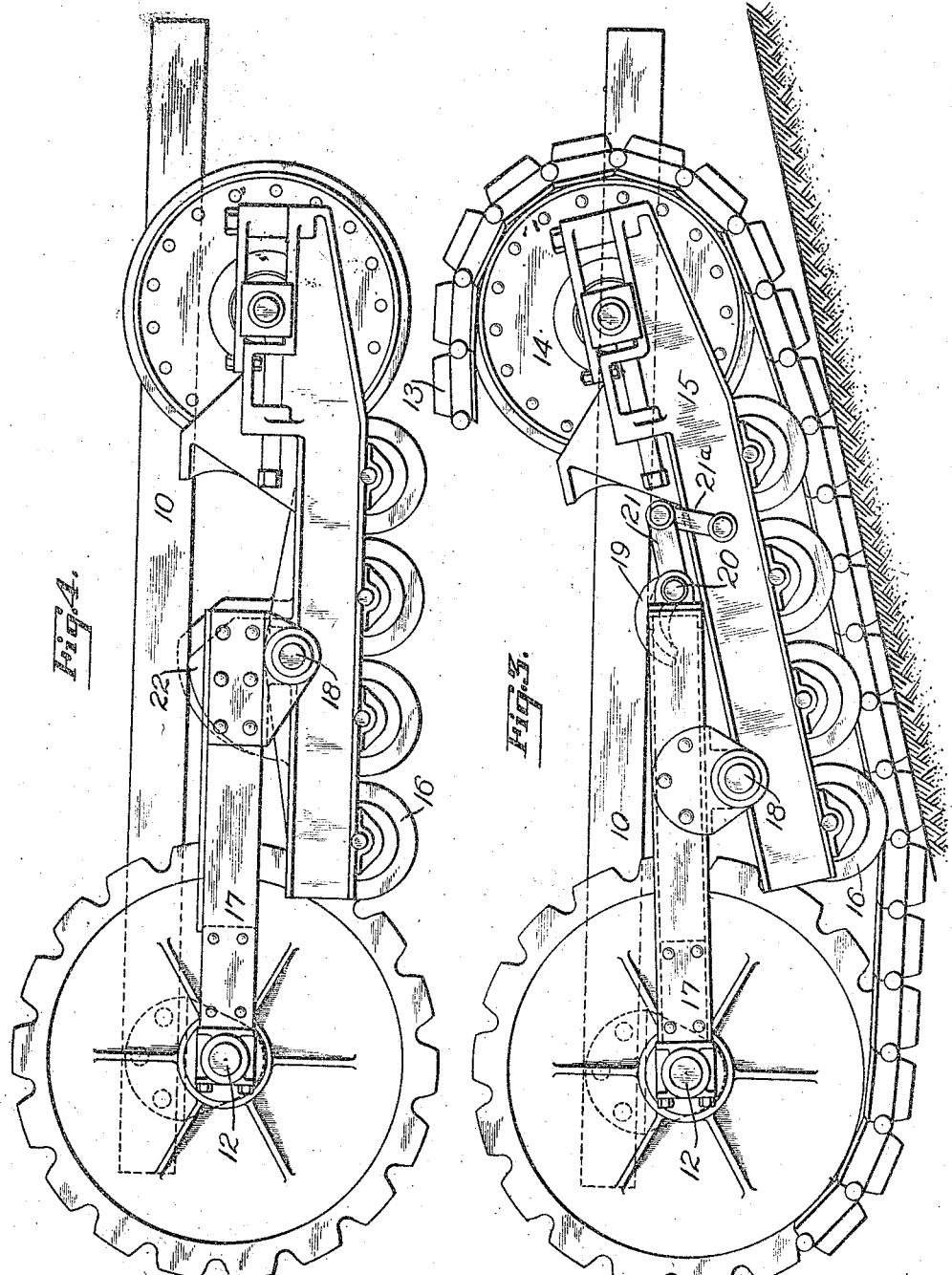

1,450,472

UNITED STATES PATENT OFFICE.

ELMER E. WICKERSHAM, OF STOCKTON, CALIFORNIA, ASSIGNOR TO THE HOLT MANUFACTURING COMPANY, OF STOCKTON, CALIFORNIA, A CORPORATION OF CALIFORNIA.

SUSPENSION FOR TRACTORS.

Application filed June 30, 1920. Serial No. 392,950.

*To all whom it may concern:*

Be it known that ELMER E. WICKERSHAM, a citizen of the United States, residing at Stockton, in the county of San Joaquin and State of California, has invented new and useful Improvements in Suspensions for Tractors, of which the following is a specification.

This invention relates to suspensions for tractors and more particularly to tractors of the self-laying track type.

It has for its object to permit the truck mechanisms to rock in a vertical plane relatively to the main frame and to each other while imparting little or no movement to the main frame.

In the accompanying drawings:

Fig. 1 shows a side elevation of a tractor embodying one form of my invention.

Fig. 2 shows a plan view of a portion of the same.

Fig. 3 shows a side elevation of the same with the rocking truck member in raised position.

Fig. 4 shows a side elevation of a modified form of my invention.

The device here shown comprises a main frame 10 at each side of which is a track laying unit consisting of a driving sprocket wheel journaled on an axle 12, which axle is fixed upon the main frame. The driving sprocket wheel carries an endless flexible chain track 13 which, at its forward end, is supported by an idler sprocket wheel 14. The said idler sprocket wheel is journaled on a truck frame 15, which truck frame carries a series of rollers 16 for operation on the ground stretch of the track.

Pivoted upon each end of the axle 12 is a swinging thrust member 17 extending forwardly and pivotally connected at 18 to the adjacent truck frame.

As shown in Figs. 1 to 3 inclusive, the pivotal connection 18 is arranged near the rear end of the truck frame and at the forward end of the swinging thrust member is a cam 19 pivotally connected to said swinging thrust member at 20 and lying beneath and supporting the side rail of the main frame. To maintain the cam 19 in proper position, I provide a crank arm 21 extending forwardly and downwardly and pivotally connected with the truck frame by means of a link 21ª.

In operation it will be seen that as the forward end of the truck frame is raised in passing over an obstruction, the cam 19 will be rocked by reason of the connections 21 and 21ª with the truck frame and the shape of this cam is such that the elevation of the main frame will remain unchanged regardless of any changes in the elevation of the truck frame at this point.

In Fig. 4 I locate the rocking connection 18 for the truck frame at the forward end of the swinging thrust member and arrange at this point a cam 22 which is fixed upon the truck frame. This cam is so shaped that when the truck frame is rocked and consequently the connection 18 changes its elevation, there will be no change in the elevation of the main frame owing to the shorter radius of that portion of the cam which comes beneath the main frame when the truck frame is rocked.

Various changes in the construction and arrangement of the several parts may be employed without departing from the spirit of my invention as disclosed in the appended claims.

Having thus described my invention, what I claim and desire to secure by Letters Patent is:

1. In a vehicle of the self-laying track type, a main frame, a truck frame at each side thereof, connecting means between the truck frame and the main frame, permitting said truck frame to rock in a vertical plane, and a load supporting connection between the truck frame and adjacent side of the main frame controlled by the rocking movement of the truck frame to permit the latter to rise without effecting any change in the elevation of the main frame.

2. In a vehicle, a main frame, an axle upon the main frame, a driving sprocket wheel carried by the axle, a swinging thrust member pivotally connected to the axle, a truck member pivotally connected with the swinging thrust member for rocking movement in a vertical plane, and a load supporting connection between the truck member and main frame comprising a cam turnable with the truck member when the latter rocks and so shaped as to maintain the main frame in substantially the same elevation regardless of changes in the elevation of the point of connection of the truck member with the swinging thrust member.

3. In a vehicle, a main frame, an axle upon the main frame, a driving sprocket wheel carried by the axle, a swinging thrust member pivotally connected to the axle, a truck member pivotally connected with the swinging thrust member for rocking movement in a vertical plane, and a load supporting connection between the truck member and main frame comprising a cam mounted for rocking movement on the forward end of the swinging thrust member and having connections with the truck member to cause the cam to be turned so as to present a shorter radius when the forward end of the truck member is moved upwardly.

4. In a vehicle, a main frame, a track-laying unit at each side thereof, including a truck frame connected with the main frame for rocking movement in a vertical plane, and a load bearing connection between the truck frame and the main frame, comprising a cam connected with the truck frame and movable when the latter rocks, so as to maintain the main frame in substantially the same elevation, regardless of changes in the elevation of the connected portion of the truck frame.

In testimony whereof I have hereunto set my hand in the presence of two subscribing witnesses.

ELMER E. WICKERSHAM.

Witnesses:
   DAVID B. LYMAN,
   EDWARD E. BREITENLUCHER.